United States Patent
Wittkopp et al.

(10) Patent No.: US 8,277,357 B2
(45) Date of Patent: Oct. 2, 2012

(54) MULTI-SPEED TRANSMISSION HAVING THREE PLANETARY GEAR SETS

(75) Inventors: Scott H. Wittkopp, Ypsilanti, MI (US); Andrew W. Phillips, Rochester, MI (US); Clinton E. Carey, Highland, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/223,049

(22) Filed: Aug. 31, 2011

(65) Prior Publication Data

US 2011/0312466 A1   Dec. 22, 2011

Related U.S. Application Data

(62) Division of application No. 12/355,440, filed on Jan. 16, 2009, now Pat. No. 8,016,715.

(51) Int. Cl.
*F16H 3/44* (2006.01)

(52) U.S. Cl. ........................................ 475/284; 475/330

(58) Field of Classification Search .................. 475/269, 475/275, 284, 330
See application file for complete search history.

(56) References Cited

U.S. PATENT DOCUMENTS

| | | | |
|---|---|---|---|
| 6,634,981 B1 | 10/2003 | Raghavan et al. | |
| 6,648,790 B2 | 11/2003 | Raghavan et al. | |
| 6,659,903 B1 | 12/2003 | Bucknor et al. | |
| 6,672,987 B1 | 1/2004 | Raghavan et al. | |
| 6,672,988 B1 | 1/2004 | Raghavan et al. | |
| 7,059,995 B2 | 6/2006 | Stevenson | |
| 7,140,996 B2 | 11/2006 | Tiesler et al. | |
| 7,914,415 B2* | 3/2011 | Hiramatsu | 475/323 |
| 8,021,262 B2* | 9/2011 | Wittkopp et al. | 475/275 |
| 2008/0015079 A1* | 1/2008 | Gumpoltsberger | 475/271 |
| 2010/0184555 A1 | 7/2010 | Wittkopp et al. | |

* cited by examiner

*Primary Examiner* — Justin Holmes

(57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

16 Claims, 3 Drawing Sheets

| GEAR STATE | GEAR RATIO | RATIO STEP | TORQUE TRANSMITTING ELEMENTS ||||||
|---|---|---|---|---|---|---|---|---|
| | | | 34 | 36 | 26 | 30 | 32 | 28 |
| Rev | -2.100 | | | X | X | | | |
| N | | -0.48 | | | | | | |
| 1st | 4.400 | | | X | | | X | |
| 2nd | 2.521 | 1.75 | X | | | | X | |
| 3rd | 1.850 | 1.36 | | | | | X | X |
| 4th | 1.331 | 1.39 | | | X | | X | |
| 5th | 1.000 | 1.33 | | | | X | X | |
| 6th | 0.750 | 1.33 | | | | X | X | |
| 7th | 0.553 | 1.36 | X | | | | X | |

X= ON, CARRYING TORQUE
O= ON, NOT CARRYING TORQUE

| GEAR STATE | GEAR RATIO | RATIO STEP | TORQUE TRANSMITTING ELEMENTS ||||| 
|---|---|---|---|---|---|---|---|
| | | | 134 | 130 | 128 | 126 | 132 |
| Rev | -3.671 | | X | | | X | |
| N | | -0.68 | O | | | | |
| 1st | 5.409 | | X | | | | X |
| 2nd | 3.465 | 1.56 | X | X | | | |
| 3rd | 2.096 | 1.65 | | X | | | X |
| 4th | 1.463 | 1.43 | | X | | X | |
| 5th | 1.000 | 1.46 | | | | X | X |
| 6th | 0.777 | 1.29 | | | X | | X |
| 7th | 0.690 | 1.13 | | | X | X | |

X = ON, CARRYING TORQUE
O = ON, NOT CARRYING TORQUE

MULTI-SPEED TRANSMISSION HAVING THREE PLANETARY GEAR SETS

CROSS-REFERENCE TO RELATED APPLICATIONS

This application is a divisional of U.S. application Ser. No. 12/355,440 filed on Jan. 16, 2009. The disclosure of the above application is incorporated herein by reference.

FIELD

The invention relates generally to a multiple speed transmission having a plurality of planetary gear sets and a plurality of torque transmitting devices, and more particularly to a transmission having seven speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of interconnecting members and a plurality of torque transmitting devices. Each of the planetary gear sets includes first, second and third members. The torque transmitting devices are for example clutches and brakes.

In one embodiment of the transmission, the input member is continuously interconnected to the sun gear member of the second planetary gear set and the output member is continuously interconnected to the ring gear member of the first planetary gear set and the carrier member of the second planetary gear set.

Further, a first interconnecting member continuously interconnects the sun gear member of the first planetary gear set to a stationary member. A second interconnecting member continuously interconnects the carrier member of the first planetary gear set with the ring gear member of the third planetary gear set.

Additionally, a first torque transmitting mechanism is selectively engageable to interconnect at least one of the sun gear member of the second planetary gear set and the input member with the sun gear member of the third planetary gear set. A second torque transmitting mechanism is selectively engageable to interconnect the sun gear member of the third planetary gear set with the carrier member of the third planetary gear set. A third torque transmitting mechanism is selectively engageable to interconnect at least one of the input member and the sun gear member of the second planetary gear set with the carrier member of the third planetary gear set. A fourth torque transmitting mechanism is selectively engageable to interconnect the ring gear member of the second planetary gear set with the carrier member of the third planetary gear set. A fifth torque transmitting mechanism is selectively engageable to interconnect the sun gear member of the third planetary gear set with the stationary member. A sixth torque transmitting mechanism is selectively engageable to interconnect the carrier member of the third planetary gear set with the stationary member.

The torque transmitting mechanisms are selectively engageable in combinations of at least two to establish at least seven forward speed ratios and at least one reverse speed ratio between the input member and the output member.

In another embodiment of the transmission, the input member is continuously interconnected to the sun gear member of the second planetary gear set and the output member is continuously interconnected to the carrier member of the second planetary gear set.

Further, a first interconnecting member continuously interconnects the sun gear member of the first planetary gear set to a stationary member. A second interconnecting member continuously interconnects the ring gear member of the first planetary gear set with the ring gear member of the second planetary gear set. A third interconnecting member continuously interconnects the carrier member of the first planetary gear set with the ring gear member of the third planetary gear set.

Additionally, a first torque transmitting mechanism is selectively engageable to interconnect at least one of the sun gear member of the second planetary gear set and the input member with the sun gear member of the third planetary gear set. A second torque transmitting mechanism is selectively engageable to interconnect at least one of the sun gear member of the second planetary gear set and the input member with the carrier member of the third planetary gear set. A third torque transmitting mechanism is selectively engageable to interconnect at least one of the ring gear member of the first planetary gear set and the ring gear member of the second planetary gear set with the carrier member of the third planetary gear set. A fourth torque transmitting mechanism is selectively engageable to interconnect the carrier member of the second planetary gear set with the sun member of the third planetary gear set. A fifth torque transmitting mechanism is selectively engageable to interconnect the carrier member of the third planetary gear set with the stationary member.

Moreover, the torque transmitting mechanisms are selectively engageable in combinations of at least two to establish at least seven forward speed ratios and at least one reverse speed ratio between the input member and the output member Thus, it is an aspect of the present invention to provide a transmission having at least seven forward speeds and at least one reverse.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
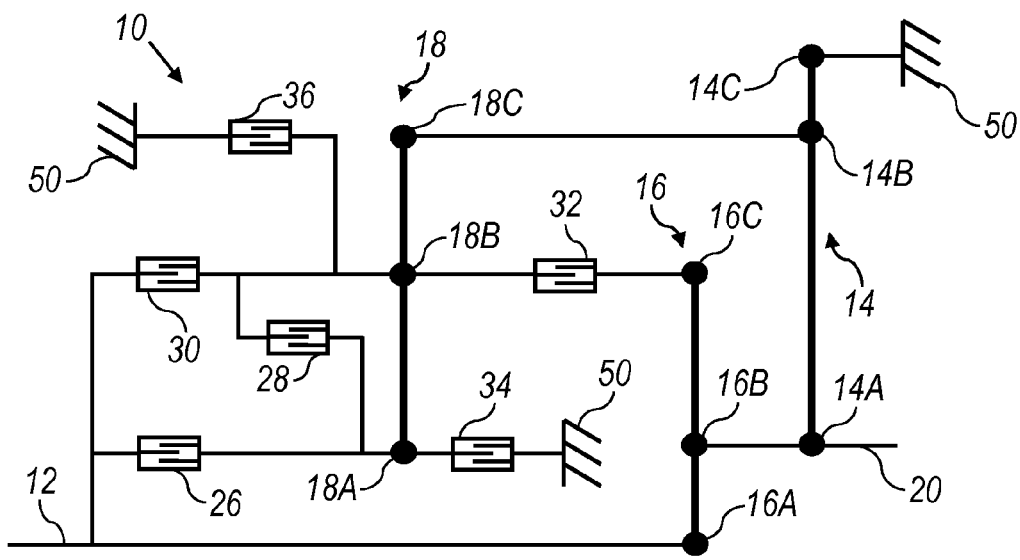
FIG. 1 is a lever diagram of an embodiment of a seven speed transmission according to the present invention.

Referring now to FIG. 1, an embodiment of an seven speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, and an output shaft or member 20.

The input shaft or member 12 is coupled to the first node 16A of the second planetary gear set 16. The output shaft or member 20 is coupled to the first node 14A of the first planetary gear set 14 and second node 16B of the second planetary gear set 16. The first node 14B of the first planetary gear set 14 is coupled to the third node 18C of the third planetary gear set 18. The third node 14C of the first planetary gear set 14 is coupled to ground or the transmission housing.

A first clutch 26 selectively connects the input shaft or member 12 and the first node 16A of the second planetary gear set 16 with the first node 18A of the third planetary gear set 18. A second clutch 28 selectively connects the second node 18B of the third planetary gear set 18 with the first node 18A of the third planetary gear set 18. A third clutch 30 selectively connects the input shaft or member 12 and the first node 16A of the second planetary gear set 16 with the second node 18B of the third planetary gear set 18. A fourth clutch 32 selectively connects the third node 16C of the second planetary gear set 16 with the second node 18B of the third planetary gear set 18. A first brake 34 selectively connects the first node 18A of the third planetary gear set 18 with a ground, a stationary member, or a transmission housing 50. A second brake 36 selectively connects the second node 18B of the third planetary gear set 18 with the ground, the stationary member, or the transmission housing 50.

Figure 2:
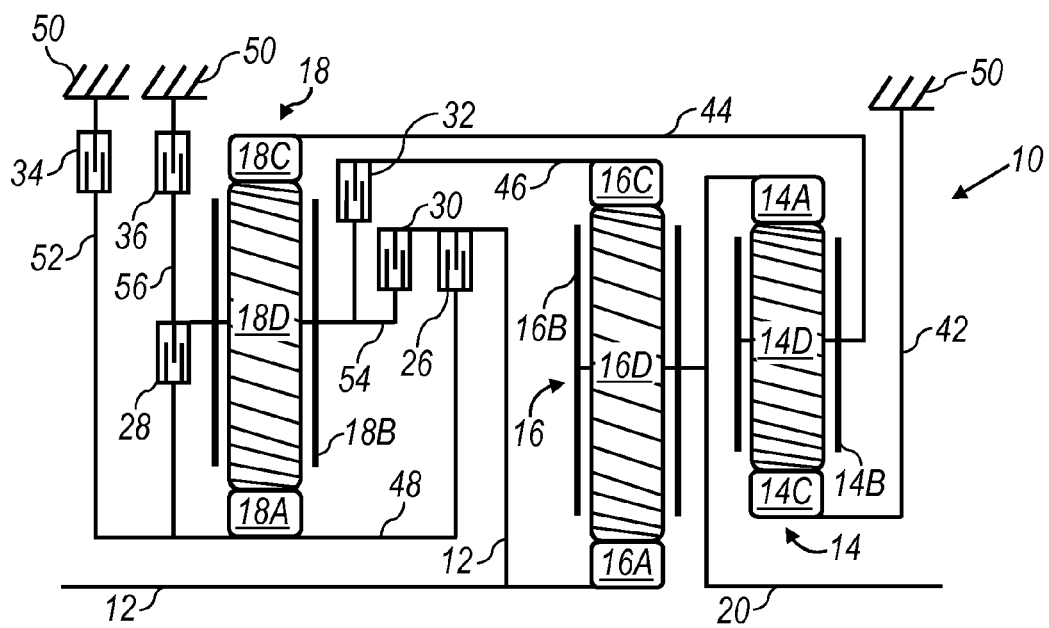
FIG. 2 is a diagrammatic view of an embodiment of a seven speed transmission according to the present invention.

Referring now to FIG. 2, a stick diagram presents a schematic layout of the embodiment of the seven speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected to a first shaft or interconnecting member 42 that is connected to the transmission housing 50, thus restricting the rotation of sun gear member 14C. The ring gear member 14A is connected for common rotation with output shaft 20. The planet carrier member 14B is connected for common rotation with a second shaft or interconnecting member 44. The planet gears 14D each are configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with input shaft or member 12. The ring gear member 16C is connected for common rotation with a third shaft or interconnecting member 46. The planet carrier member 16B is connected for common rotation with output shaft or member 20. Each of the planet gears 16D are configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fourth shaft or interconnecting member 48 and with a fifth shaft or interconnecting member 52. The ring gear member 18C is connected for common rotation with the second shaft or interconnecting member 44. The planet carrier member 18B is connected for common rotation with the sixth shaft or interconnecting member 54 and a seventh shaft or interconnecting member 56. The planet gears 18D are each configured to intermesh with both the sun gear member 18A and the ring gear member 18C.

The input shaft or member 12 is continuously connected to an engine (not shown) or to a turbine of a torque converter (not shown). The output shaft or member 20 is continuously connected with the final drive unit or transfer case (not shown).

The torque-transmitting mechanisms or clutches 26, 28, 30, 32 and brakes 34 and 36 allow for selective interconnection of the shafts or interconnecting members, members of the planetary gear sets and the housing. For example, the first clutch 26 is selectively engageable to connect the fourth shaft or interconnecting member 48 with the input shaft or member 12. The second clutch 28 is selectively engageable to connect the fifth shaft or interconnecting member 52 with the seventh shaft or interconnecting member 56. The third clutch 30 is selectively engageable to connect the input shaft or member 12 with the sixth shaft or interconnecting member 54. The fourth clutch 32 is selectively engageable to connect the third shaft or interconnecting member 46 with the sixth shaft or interconnecting member 54. The first brake 34 is selectively engageable to connect the fifth shaft or interconnecting member 52 with the stationary member or the transmission housing 50 in order to restrict the fifth interconnecting member 52 from rotating relative to the transmission housing 50. The second brake 36 is selectively engageable to connect the seventh shaft or interconnecting member 56 with the stationary member or the transmission housing 50 in order to restrict the seventh interconnecting member 56 from rotating relative to the transmission housing 50.

Figures 3, 4:
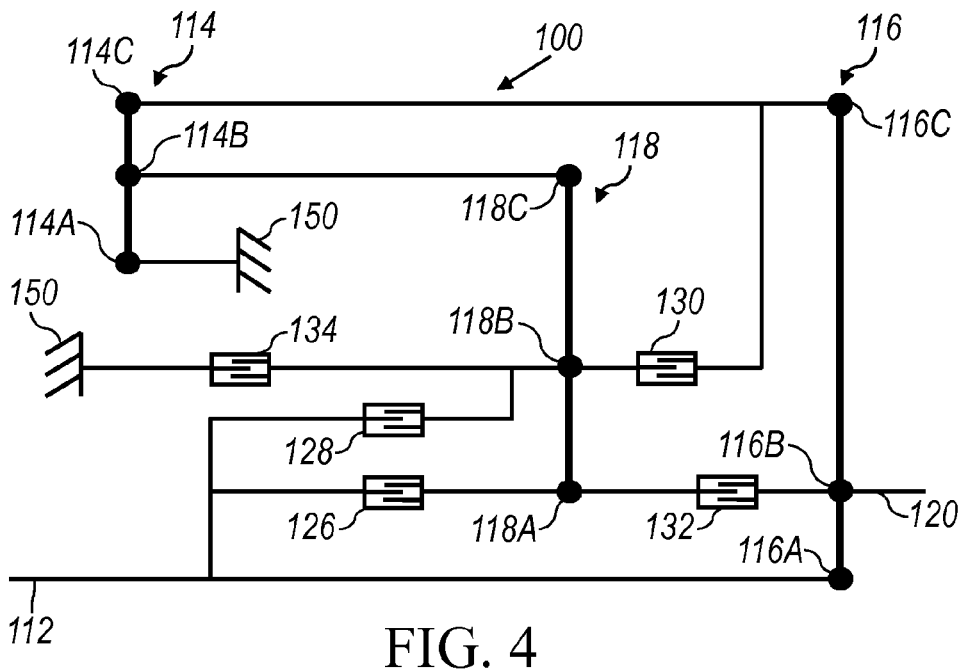
FIG. 3 is a truth table presenting the state of engagement of the various torque transmitting mechanisms in each of the available forward and reverse speeds or gear ratios of the transmission illustrated in FIGS. 1 and 2.
FIG. 4 is a lever diagram of another embodiment of a seven speed transmission according to the present invention.

Referring now to FIG. 2 and FIG. 3, the operation of the embodiment of the seven speed transmission 10 will be described. It will be appreciated that transmission 10 is capable of transmitting torque from the input shaft or member 12 to the output shaft or member 20 in at least seven forward speed or torque ratios and at least one reverse speed or torque ratio with single transition sequential shifts and a double overdrive. Each forward and reverse speed or torque ratio is attained by engagement of one or more of the torque-transmitting mechanisms (i.e. first clutch 26, second clutch 28, third clutch 30, fourth clutch 32, first brake 34 and second brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear first clutch 26 and second brake 36 are engaged or activated. The first clutch 26 connects the fourth shaft or interconnecting member 48 with the input shaft or member 12. The second brake 36 connects the seventh shaft or interconnecting member 56 with the stationary member or the transmission housing 50 in order to restrict the seventh interconnecting member 56 from rotating relative to the transmission housing 50. Likewise, the seven forward ratios are achieved through different combinations of clutch and brake engagement, as shown in FIG. 3.

It will be appreciated that the foregoing explanation of operation and gear states of the seven speed transmission 10 assumes, first of all, that all the clutches or brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Referring now to FIG. 4, another embodiment of a seven speed transmission 100 is illustrated in a lever diagram format. The transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, and an output shaft or member 120.

The input shaft or member 112 is coupled to the first node 116A of the second planetary gear set 116. The output shaft or member 120 is coupled to the second node 116B of the second planetary gear set 116. The third node 114C of the first planetary gear set 114 is coupled to the third node 116C of the second planetary gear set 116. The third node 118C of the third planetary gear set 118 is coupled to the second node 114B of the first planetary gear set 114. The first node 114A of the first planetary gear set 114 is permanently connected to ground or transmission housing 150.

A first clutch 126 selectively connects the input shaft or member 112 and the first node 116A of the second planetary gear set 116 with the first node 118A of the third planetary gear set 118. A second clutch 128 selectively connects the input shaft or member 112 and the first node 116A of the second planetary gear set 116 with the second node 118B of the third planetary gear set 118. A third clutch 130 selectively connects the second node 118B of the third planetary gear set 118 with the third node 114C of the first planetary gear set 114 and the third node 116C of the second planetary gear set 116. A fourth clutch 132 selectively connects the second node 116B of the second planetary gear set 116 and the output shaft 120 with the first node 118A of the third planetary gear set 118. A brake 134 selectively connects the second node 118B of the third planetary gear set 118 with a ground, a stationary member, or a transmission housing 150.

Figures 5, 6:
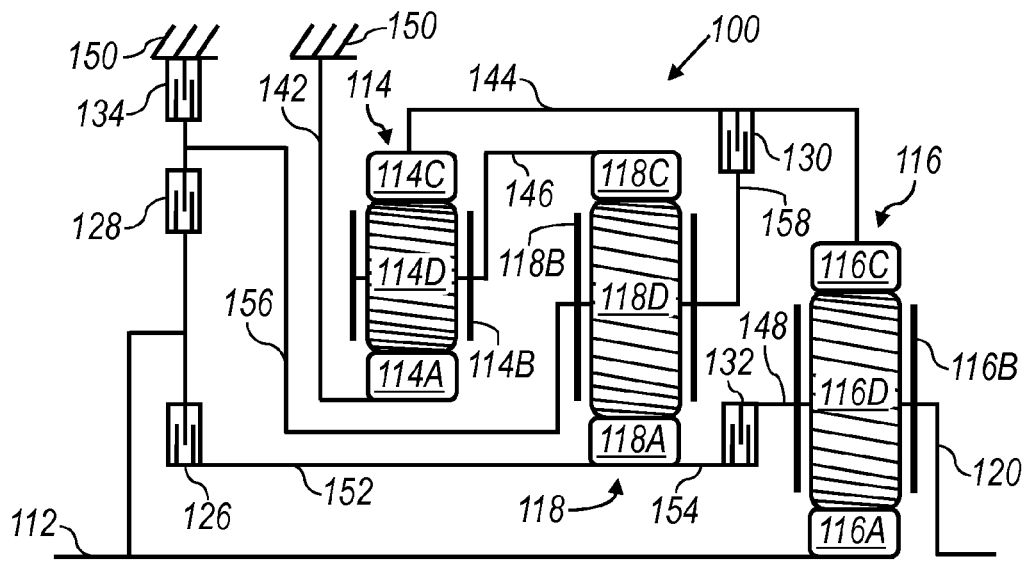
FIG. 5 is a diagrammatic view of another embodiment of a seven speed transmission according to the present invention.
FIG. 6 is a truth table presenting the state of engagement of the various torque transmitting mechanisms in each of the available forward and reverse speeds or gear ratios of the transmission illustrated in FIGS. 4 and 5.

Referring now to FIG. 5, a stick diagram presents a schematic layout of the embodiment of the seven speed transmission 100 according to the present invention. In FIG. 5, the numbering from the lever diagram of FIG. 4 is carried over. The clutches, brake and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114A, a ring gear member 114C and a planet gear carrier member 114B that rotatably supports a set of planet gears 114D (only one of which is shown). The sun gear member 114A is connected to a first shaft or interconnecting member 142 that is permanently connected to ground or transmission housing 150 and, thus, restricts the rotation of first shaft or interconnecting member 142. The ring gear member 114C is connected for common rotation with a second shaft or interconnecting member 144. The planet carrier member 114B is connected for common rotation with a third shaft or interconnecting member 146. The planet gears 114D are each configured to intermesh with both the sun gear member 114A and the ring gear member 114C.

The planetary gear set 116 includes a sun gear member 116A, a ring gear member 116C and a planet gear carrier member 116B that rotatably supports a set of planet gears 116D (only one of which is shown). The sun gear member 116A is connected for common rotation with input shaft or member 112. The ring gear member 116C is connected for common rotation with the second shaft or interconnecting member 144. The planet carrier member 116B is connected for common rotation with a fourth shaft or interconnecting member 148 and with output shaft or member 120. The planet gears 116D each are configured to intermesh with both the sun gear member 116A and the ring gear member 116C.

The planetary gear set 118 includes a sun gear member 118A, a ring gear member 118C and a planet gear carrier member 118B that rotatably supports a set of planet gears 118D (only one of which is shown). The sun gear member 118A is connected for common rotation with a fifth shaft or interconnecting member 152 and with a sixth shaft or interconnecting member 154. The ring gear member 118C is connected for common rotation with the third shaft or interconnecting member 146. The planet carrier member 118B is connected for common rotation with a seventh shaft or interconnecting member 156 and with an eighth shaft or interconnecting member 158. The planet gears 118D are configured to each intermesh with both the sun gear member 118A and the ring gear member 118C.

The input shaft or member 112 is continuously connected to an engine (not shown) or to a turbine of a torque converter (not shown). The output shaft or member 120 is continuously connected with the final drive unit or transfer case (not shown).

The torque-transmitting mechanisms or clutches 126, 128, 130, 132 and brake 134 allow for selective interconnection of the shafts or interconnecting members, members of the planetary gear sets and the housing. For example, the first clutch 126 is selectively engageable to connect the fifth shaft or interconnecting member 152 with the input shaft or member 112. The second clutch 128 is selectively engageable to connect the input shaft or member 112 with the seventh shaft or interconnecting member 156. The third clutch 130 is selectively engageable to connect the second shaft or interconnecting member 144 with the seventh shaft or interconnecting member 158. The fourth clutch 132 is selectively engageable to connect the fourth shaft or interconnecting member 148 with the sixth shaft or interconnecting member 154. The brake 134 is selectively engageable to connect the seventh shaft or interconnecting member 156 with the stationary member or the transmission housing 150 in order to restrict the member 156 from rotating relative to the transmission housing 150.

Referring now to FIG. 5 and FIG. 6, the operation of the embodiment of the seven speed transmission 100 will be described. It will be appreciated that transmission 100 is capable of transmitting torque from the input shaft or member 112 to the output shaft or member 120 in at least seven forward speed or torque ratios and at least one reverse speed or torque ratio with single transition sequential shifts and a double overdrive. Each forward and reverse speed or torque ratio is attained by engagement of one or more of the torque-transmitting mechanisms (i.e. first clutch 126, second clutch 128, third clutch 130, fourth clutch 132 and brake 134), as will be explained below. FIG. 6 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish a reverse gear, the first clutch 126 and brake 134 are engaged or activated. The first clutch 126 connects the fifth shaft or interconnecting member 152 with the input shaft or member 112. The brake 134 connects the seventh shaft or interconnecting member 156 with the stationary member or the transmission housing 150 in order to restrict the member 156 from rotating relative to the transmission housing 150. Likewise, the seven forward ratios are achieved through different combinations of clutch and brake engagement, as shown in FIG. 6.

It will be appreciated that the foregoing explanation of operation and gear states of the seven speed transmission 100 assumes, first of all, that all the clutches or brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, and third planetary gear sets each having first, second and third members, wherein the input member is continuously interconnected with the first member of the second planetary gear set;
a first interconnecting member continuously interconnecting the first member of the first planetary gear set to a stationary member;
a second interconnecting member continuously interconnecting the third member of the first planetary gear set with the third member of the second planetary gear set;
a third interconnecting member continuously interconnecting the second member of the first planetary gear set with the third member of the third planetary gear set; and
five torque transmitting mechanisms each selectively engageable to interconnect at least one of the first, second, and third members with at least one other of the first, second, third members and the stationary member, and
wherein the torque transmitting mechanisms are selectively engageable in combinations of at least two to establish at least seven forward speed ratios and at least one reverse speed ratio between the input member and the output member.

2. The transmission of claim 1 wherein a first of the five torque transmitting mechanisms is selectively engageable to interconnect at least one of the first member of the second planetary gear set and the input member with the first member of the third planetary gear set.

3. The transmission of claim 2 wherein a second of the five torque transmitting mechanisms is selectively engageable to interconnect at least one of the first member of the second planetary gear set and the input member with the second member of the third planetary gear set.

4. The transmission of claim 3 wherein a third of the five torque transmitting mechanisms is selectively engageable to interconnect at least one of the third member of the first planetary gear set and the third member of the second planetary gear set with the second member of the third planetary gear set.

5. The transmission of claim 4 wherein a fourth of the five torque transmitting mechanisms is selectively engageable to interconnect the second member of the second planetary gear set with the first member of the third planetary gear set.

6. The transmission of claim 5 wherein a fifth of the five torque transmitting mechanisms is selectively engageable to interconnect the second member of the third planetary gear set with the stationary member.

7. The transmission of claim 6 wherein the first members of the first, second and third planetary gear sets are sun gears, the second members of the first, second and third planetary gear sets are carrier members, and the third members of the first, second and third planetary gear sets are ring gears.

8. The transmission of claim 1 wherein one of the torque transmitting mechanisms is a brake for connecting at least one of the first, second, and third members to the stationary member and four of the torque transmitting mechanisms are clutches for connecting a set of the first, second, and third members to another set of the first, second, and third members.

9. The transmission of claim 1 wherein the output member is continuously interconnected with the second member of the second planetary gear set.

10. The transmission of claim 1 wherein the stationary member is a transmission housing.

11. A transmission comprising:
an input member;
an output member;
first, second, and third planetary gear sets each having first, second and third members, wherein the input member is continuously interconnected to the first member of the second planetary gear set and the output member is continuously interconnected to the second member of the second planetary gear set;
a first interconnecting member continuously interconnecting the first member of the first planetary gear set to a stationary member;
a second interconnecting member continuously interconnecting the third member of the first planetary gear set with the third member of the second planetary gear set;
a third interconnecting member continuously interconnecting the second member of the first planetary gear set with the third member of the third planetary gear set; and
a first torque transmitting mechanism selectively engageable to interconnect at least one of the first member of the second planetary gear set and the input member with the first member of the third planetary gear set;
a second torque transmitting mechanism selectively engageable to interconnect at least one of the first member of the second planetary gear set and the input member with the second member of the third planetary gear set;
a third torque transmitting mechanism selectively engageable to interconnect at least one of the third member of the first planetary gear set and the third member of the second planetary gear set with the second member of the third planetary gear set;
a fourth torque transmitting mechanism selectively engageable to interconnect the second member of the second planetary gear set with the first member of the third planetary gear set; and
a fifth torque transmitting mechanism selectively engageable to interconnect the second member of the third planetary gear set with the stationary member, and wherein the torque transmitting mechanisms are selectively engageable in combinations of at least two to establish at least seven forward speed ratios and at least one reverse speed ratio between the input member and the output member.

12. The transmission of claim 11 wherein the first members of the first, second and third planetary gear sets are sun gears, the second members of the first, second and third planetary gear sets are carrier members, and the third members of the first, second and third planetary gear sets are ring gears.

13. The transmission of claim 11 wherein the stationary member is a transmission housing.

14. A transmission comprising:
an input member;
an output member;
first, second, and third planetary gear sets each having a sun gear, a carrier member, and a ring gear, wherein the input member is continuously interconnected to the sun gear of the second planetary gear set;
a first interconnecting member continuously interconnecting the sun gear of the first planetary gear set to a stationary member;
a second interconnecting member continuously interconnecting the ring gear of the first planetary gear set with the ring gear of the second planetary gear set;
a third interconnecting member continuously interconnecting the carrier member of the first planetary gear set with the ring gear of the third planetary gear set; and
a first torque transmitting mechanism selectively engageable to interconnect at least one of the sun gear of the second planetary gear set and the input member with the sun gear of the third planetary gear set;
a second torque transmitting mechanism selectively engageable to interconnect at least one of the sun gear of the second planetary gear set and the input member with the carrier member of the third planetary gear set;
a third torque transmitting mechanism selectively engageable to interconnect at least one of the ring gear of the first planetary gear set and the ring gear of the second planetary gear set with the carrier member of the third planetary gear set;
a fourth torque transmitting mechanism selectively engageable to interconnect the carrier member of the second planetary gear set with the sun gear of the third planetary gear set; and
a fifth torque transmitting mechanism selectively engageable to interconnect the carrier member of the third planetary gear set with the stationary member, and
wherein the torque transmitting mechanisms are selectively engageable in combinations of at least two to establish at least seven forward speed ratios and at least one reverse speed ratio between the input member and the output member.

15. The transmission of claim 14 the output member is continuously interconnected to the carrier member of the second planetary gear set.

16. The transmission of claim 15 wherein the stationary member is a transmission housing.

* * * * *